US008002373B2

(12) United States Patent
Yamashita et al.

(10) Patent No.: US 8,002,373 B2
(45) Date of Patent: Aug. 23, 2011

(54) DRIVER DEVICE AND LIQUID DROPLET EJECTION DEVICE

(75) Inventors: Toru Yamashita, Tokai (JP); Koji Imai, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 787 days.

(21) Appl. No.: 12/045,447

(22) Filed: Mar. 10, 2008

(65) Prior Publication Data

US 2008/0246788 A1 Oct. 9, 2008

(30) Foreign Application Priority Data

Mar. 8, 2007 (JP) ................................ 2007-058258

(51) Int. Cl.
*B41J 29/38* (2006.01)
*B41J 2/045* (2006.01)
*H02N 2/00* (2006.01)

(52) U.S. Cl. ............................... 347/9; 347/68; 310/317

(58) Field of Classification Search ........................ None
See application file for complete search history.

(56) References Cited

U.S. PATENT DOCUMENTS

| | | | | |
|---|---|---|---|---|
| 3,965,330 | A * | 6/1976 | Williams | 347/210 |
| 7,084,762 | B2 | 8/2006 | Pedrazzini et al. | |
| 2004/0183148 | A1 * | 9/2004 | Blasko, III | 257/415 |

FOREIGN PATENT DOCUMENTS

| | | | |
|---|---|---|---|
| JP | 2004098465 | A | 4/2004 |
| JP | 2004236306 | A | 8/2004 |

* cited by examiner

*Primary Examiner* — Omar Rojas
(74) *Attorney, Agent, or Firm* — Baker Botts L.L.P.

(57) ABSTRACT

In a switch provided in a driver device and connected to a driver, a terminal and a lever is separated from each other (in the separated state) when a predetermined electric potential is not applied to a gate electrode. When a predetermined electric potential is applied to the gate electrode, the lever of the corresponding switch is deformed by electrostatic force between the gate electrode and the lever and comes into contact with the terminal, and thus the terminals are connected with the lever (in the contact state). A plurality of drivers are connected to the terminals of two or more of switches, respectively, and, when a driving potential is outputted from a driver, the driving potential is applied to a surface individual electrode connected to the switch in the contact state.

3 Claims, 10 Drawing Sheets

DRIVER DEVICE AND LIQUID DROPLET EJECTION DEVICE

CROSS-REFERENCE TO RELATED APPLICATION

This non-provisional application claims priority under 35 U.S.C. §119(a) on Patent Application No. 2007-058258 filed in Japan on Mar. 8, 2007, the entire contents of which are hereby incorporated by reference.

TECHNICAL FIELD

The present invention relates to a driver device for driving recording elements for recording on a recording medium, and a liquid droplet ejection device including the driver device.

BACKGROUND

Some recording device for recording on a recording medium, such as an inkjet printer, includes a driver device for driving a recording element for recording on a recording medium. For example, an inkjet printer head disclosed in Japanese Patent Application Laid-Open No. 2004-98465 comprises a stack of cavity plate and piezoelectric actuator, and a driver IC (driver device) connected to the piezoelectric actuator. The driver IC includes drivers corresponding to a plurality of individual electrodes, and drives the piezoelectric actuator by applying a driving potential to a corresponding individual electrode from each driver.

SUMMARY

In order to realize high resolution, a recording device such as an inkjet head needs a large number of nozzles arranged at a high density. However, for example, in the driver IC disclosed in Japanese Patent Application Laid-Open No. 2004-98465, a larger number of drivers are required with an increase in the density of the nozzles. The size of the driver IC becomes larger as the number of the drivers increases. Moreover, with an increase in the number of the drivers, heat generated in the driver IC increases, and, if the heat generated in the driver IC is transmitted to the recording element, the viscosity of ink may change and the ink ejection characteristic may vary. Further, with an increase in the number of the drivers, a larger leakage current flows from the drivers to the piezoelectric actuator when the piezoelectric actuator is not driven, and power consumption increases.

Hence, it is an object of the invention to provide a driver device capable of reducing, as much as possible, the transmission of heat to the recording elements and the consumption of power, without excessively increasing the size of the driver device even when the number of the recording elements is increased, and to provide a liquid droplet ejection device including such a driver device.

A driver device according to a first aspect is a driver device for driving a plurality of recording elements for recording on a recording medium by supplying electric power based on inputted data, comprising: at least one power supply circuit for supplying the electric power to said plurality of recording elements; a plurality of mechanical switches corresponding to said plurality of recording elements respectively and capable of switching connection and disconnection between said plurality of recording elements and said power supply circuit; and a switch control circuit for controlling switching between the connection and disconnection implemented by said plurality of mechanical switches, wherein said power supply circuit, said mechanical switches and said switch control circuit are constructed as MEMS, and two or more of said mechanical switches are connected to one of the power supply circuit(s).

A liquid droplet ejection device according to a second aspect is a liquid droplet ejection device comprising; a channel unit having liquid channels including a plurality of nozzles for ejecting liquid droplets and a plurality of pressure chambers communicated with said nozzles respectively; a piezoelectric actuator for giving pressure for ejection to liquid in said pressure chambers, said piezoelectric actuator including a piezoelectric layer arranged on a surface of said channel unit to cover said plurality of pressure chambers and a plurality of drive electrodes formed on a surface of said piezoelectric layer to correspond to said plurality of pressure chambers; and a driver device, mounted on the surface of said piezoelectric layer, for driving said piezoelectric actuator, wherein said driver device comprises: at least one power supply circuit for supplying electric power to said plurality of drive electrodes; a plurality of mechanical switches corresponding to said plurality of drive electrodes respectively, connected to said plurality of drive electrodes and said power supply circuit, and capable of switching connection and disconnection between said plurality of drive electrodes and said power supply circuit; and a switch control circuit for controlling switching between the connection and disconnection implemented by said mechanical switches, wherein said power supply circuit, said mechanical switches and said switch control circuit are constructed as MEMS, and two or more of said mechanical switches are connected to one of the power supply circuit(s).

According to the first and second aspects, it is possible to supply electric power to a plurality of recording elements by one power supply circuit. Therefore, even when there are a large number of recording elements, or even when a large number of nozzles are arranged at a high density in a liquid droplet ejection device, the number of power supply circuits is small, and it is possible to achieve a small-size driver device.

Moreover, when the connection between the power supply circuit and the recording element is disconnected by a mechanical switch, the connection between them is physically disconnected. Hence, a leakage current does not flow between the power supply circuit and the recording element, and the consumption of power is reduced.

In addition, when the connection between the power supply circuit and the recording element is disconnected by the mechanical switch, the connection between them is physically disconnected, and therefore heat is hardly transmitted from the driver device to the recording element, piezoelectric actuator and channel unit. It is thus possible to reduce changes in the viscosity of ink in the recording elements, and it is possible to prevent changes in the characteristic of recording on a recording medium and variations in the characteristic of ejecting liquid from the nozzles.

Further, since the power supply circuit, mechanical switches and switch control circuit are constructed as MEMS, it is possible to easily form them, and it is possible to reduce the size of the mechanical switches. Here, MEMS (Micro Electro Mechanical System) is a system in which a mechanical structure and an electrical structure, such as a circuit, are both formed on a single substrate surface.

According to a second aspect, since the driver device is placed on the surface of a piezoelectric layer, it is possible to form wiring for connecting drive electrodes and the driver device on the surface of the piezoelectric layer. Thus, it is not necessary to provide expensive wiring members such as a COF (Chip on Film) or FPC (Flexible Printed Circuit) in order to connect drive electrodes and the driver device, and it is possible to reduce the cost.

The above and further objects and features will more fully be apparent from the following detailed description with accompanying drawings.

DETAILED DESCRIPTION

The following description will explain a preferred embodiment. In the following explanation, the direction in which ink is ejected from nozzles onto recording paper is the downward direction and the opposite direction is the upward direction. The scanning direction of a carriage in FIG. 1 is the left-right direction.

Figure 1:
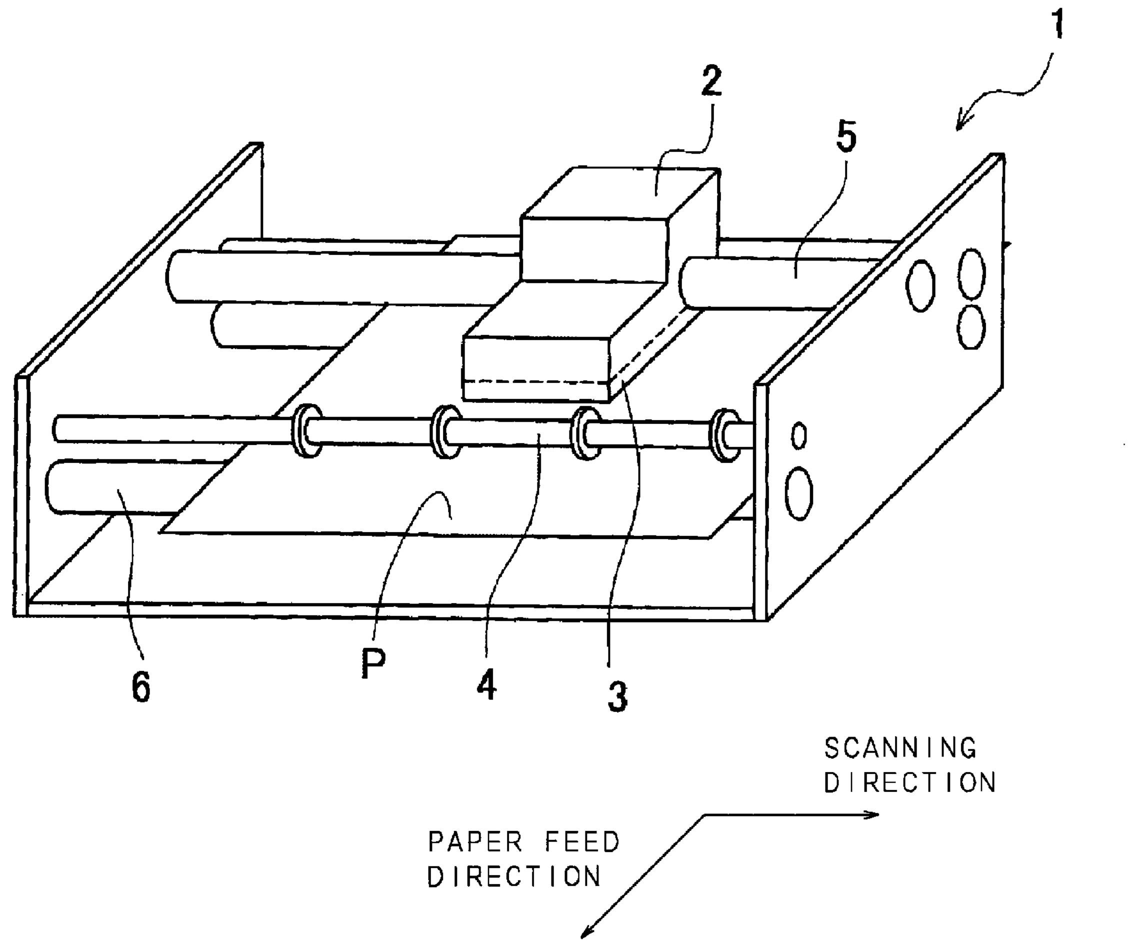
FIG. 1 is a schematic structural view of a printer according to an embodiment.

FIG. 1 is a schematic structural view of a printer according to this embodiment. As shown in FIG. 1, a printer 1 comprises a carriage 2, an inkjet head 3, and a paper feed roller 4.

The carriage 2 is a substantially box-shaped case made of resin, mounted movably on a guide shaft 5 extending in the left-right direction (scanning direction) in FIG. 1, and constructed to move reciprocally in the left-right direction (scanning direction) by a drive unit, not shown. An ink cartridge (not shown) containing a plurality of ink (for example, four colored ink of black, yellow, magenta, and cyan) is connected through ink tubes (not shown) to the inkjet head 3 mounted in the carriage 2. The paper feed roller 4 and a platen 6 are located under the carriage 2, and recording paper P is fed into the space between them in the frontward direction (paper feed direction) in FIG. 1. The inkjet head 3 is adhered and fixed to the lower surface of the carriage 2, and ejects ink from a plurality of nozzles 16 (see FIG. 2) having openings exposed in the lower surface of the inkjet head 3 while moving reciprocally in the scanning direction together with the carriage 2 to perform printing on the recording paper P. The recording paper P on which printing has been completed is discharged by the paper feed roller 4. Moreover, disposed in the carriage 2 is a head substrate 52 (see FIG. 5) which is electrically connected to the inkjet printer main body.

Figure 2:
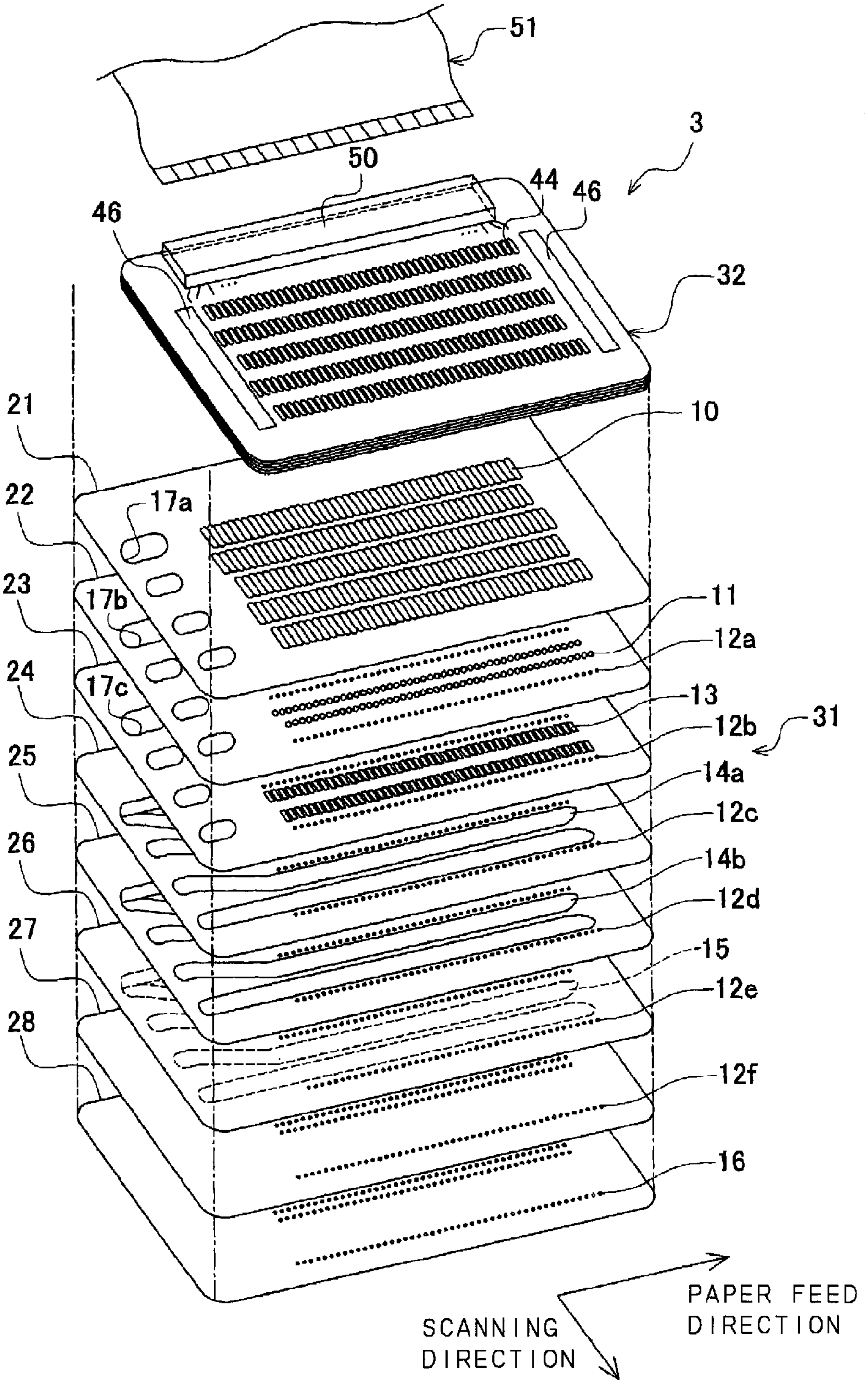
FIG. 2 is an exploded perspective view of an inkjet head in FIG. 1.
Figure 3:
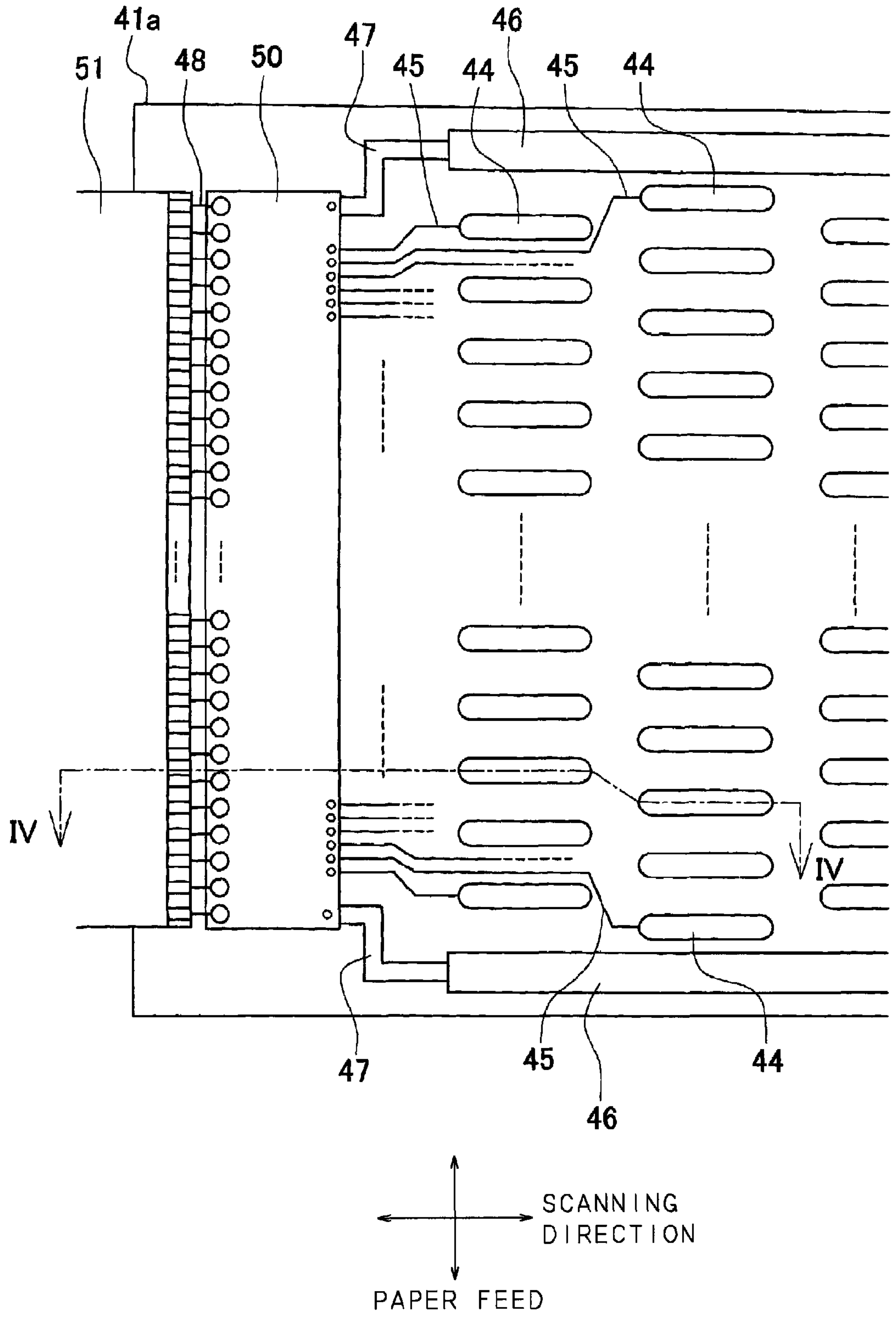
FIG. 3 is a plan view showing the inkjet head seen from the above.
Figure 4:
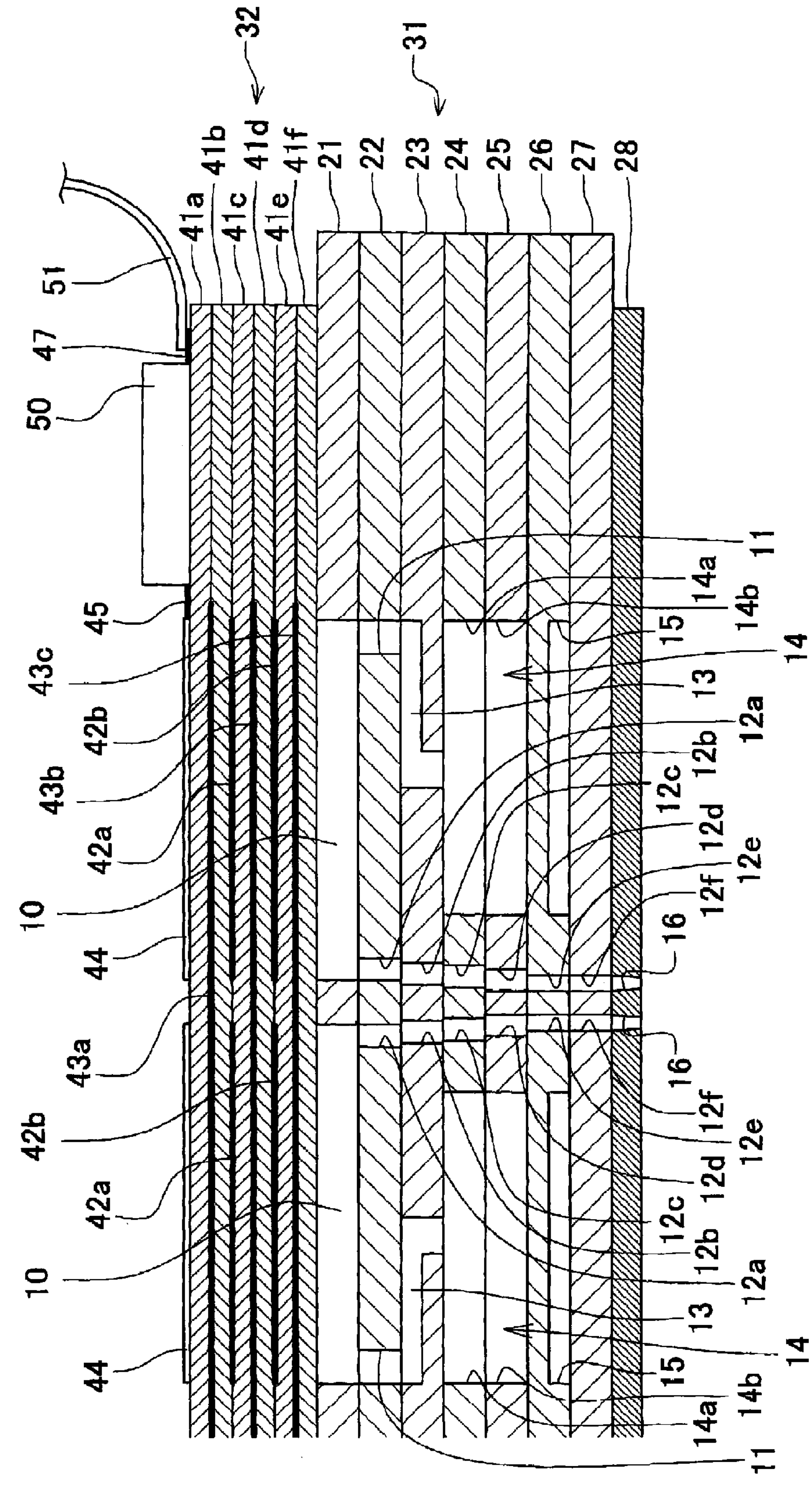
FIG. 4 is a cross sectional view taken along the IV-IV line in FIG. 3.

Next, the inkjet head 3 will be explained. FIG. 2 is an exploded perspective view of the inkjet head 3. FIG. 3 is a plan view of the inkjet head 3 seen from the above. FIG. 4 is a cross sectional view taken along the IV-IV line in FIG. 3.

As shown in FIGS. 2 to 4, the inkjet head 3 comprises a channel unit 31 in which a plurality of ink channels (liquid channels) such as pressure chambers 10 are provided, and a piezoelectric actuator 32 placed on the upper surface of the channel unit 31 to apply ejection pressure to the ink in the pressure chambers 10, the ink channel unit 31 and the piezoelectric actuator 32 being joined together. Mounted on the surface of the piezoelectric actuator 32 is a driver IC 50 (driver device) for applying a driving potential for selectively driving the piezoelectric actuator 32 according to print data sent from the main body. The driver IC 50 is connected through an FFC (flexible flat cable) 51 to the head substrate 52 mounted in the carriage 2.

The channel unit 31 comprises a laminated stack of eight plates including a cavity plate 21, a base plate 22, an aperture plate 23, two manifold plates 24 and 25, a dumper plate 26, a supply plate 27 and a nozzle plate 28 which are joined together with an adhesive. Among the eight plates 21 to 28, seven plates 21 to 27 other than the nozzle plate 28 are fabricated with metal materials, such as a stainless plate and a nickel alloy steel plate, and the nozzle plate 28 is fabricated with a synthetic resin material such as polyimide.

The ink channels provided in the channel unit 31 are constructed so that the ink supplied from the ink cartridge is reserved in manifold channels 14*a* and 14*b* (or collectively referred to as the manifold channels 14) provided in the manifold plates 24 and 25, respectively, through ink supply ports 17*a* to 17*c* (or collectively referred to as the ink supply ports 17) formed in the cavity plate 21, the base plate 22, and the aperture plate 23, respectively, and then the ink is supplied to a plurality of pressure chambers 10 provided in the cavity plate 21 through apertures 13 formed in the aperture plate 23 connected to the manifold channels 14 and through-holes 11 formed in the base plate 22. The respective pressure chambers 10 are communicated with a plurality of nozzles 16 provided in the nozzle plate 28 via through-holes 12*a* to 12*f* formed in the base plate 22, aperture plate 23, manifold plates 24 and 25, dumper plate 26 and supply plate 27, respectively. In other words, when the piezoelectric actuator 32 gives pressure selectively to the pressure chamber 10, the ink filling each ink channel in the channel unit 31 flows from the outlet of the manifold channel 14 to the nozzle 16 through the pressure chamber 10 and is then ejected. The details will be explained next.

In the nozzle plate 28 as the lowest layer in the channel unit 31, a plurality of nozzles 16 for ejecting the ink are formed by making holes in the paper feed direction so that they are arranged in five lines in the scanning direction. The reason why five lines of nozzles 16 are arranged for four colored ink is because two lines of the nozzles 16 are arranged for ejecting black ink which is used highly frequently.

In the cavity plate 21 as the topmost layer, a plurality of pressure chambers 10 going through the thickness of the plate are provided in the paper feed direction, and five lines of such pressure chambers 10 are arranged in the scanning direction. The pressure chamber 10 has an elongated shape when seen in the plan view with its longitudinal direction running in the scanning direction, and has one end communicated with the through-hole 11 and the other end communicated with the nozzle 16. On one end (the left end in FIG. 2) of the cavity plate 21 in the paper feed direction, four ink supply ports 17*a* for supplying a plurality of colored (four colored) ink from the ink cartridge to the manifold channels 14 are arranged in the scanning direction.

In the base plate 22, the through-holes 11 and 12*a* are provided at positions overlapping both ends in the longitudinal direction of the pressure chambers 10 when seen in the plan view. Moreover, ink supply ports 17*b* are formed to go through the base plate 22 at positions overlapping the ink supply ports 17*a* when seen in the plan view.

The aperture plate 23 has apertures 13 as diaphragms extending in the scanning direction from positions overlapping the through-holes 11 to substantially the center of the corresponding pressure chambers 10 in the longitudinal direction when seen in the plan view. Further, through-holes 12*b* and ink supply ports 17*c* are formed to go through the aperture plate 23 at positions overlapping the through-holes 12*b* and the ink supply ports 17*b*, respectively, when seen in the plan view.

In the manifold plates 24 and 25, five manifold channels 14*a* and 14*b*, which run in the paper feed direction to correspond to the five lines of the pressure chambers 10 provided in the cavity plate 21 and overlap the pressure chambers 10 in the longitudinal direction when seen in the plan view, are provided so that they face each other and go through the manifold plates 24 and 25. One end of each of the manifold channels 14*a* and 14*b* is extended to a position so that it is connected to the ink supply port 17. The manifold channels 14*a* and 14*b* are formed by placing the aperture plate 23 and the dumper plate 26 on the manifold plates 24 and 25 and joining them together. The ink supplied to the ink supply ports 17 is reserved in the manifold channels 14. Moreover, through-holes 12*c* and 12*d* are formed in the manifold plates 24 and 25, respectively, at positions overlapping the through-holes 12*b* when seen in the plan view. The reason why five manifold channels 14 are provided for four ink supply ports 17 for supplying four colored ink is because two manifold channels 14 are provided for an ink supply port 17 for supplying black ink which is used highly frequently.

In the dumper plate 26, five recessed sections 15 formed by half-etching the lower surface of the dumper plate 26 are provided at positions overlapping the manifold channels 14 when seen in the plan view. The dumper plate 26 is thinner in the part where the recessed sections 15 are formed. As to be described later, a pressure wave, which is created in the pressure chamber 10 when ejecting ink from the nozzle 16 by driving the piezoelectric actuator 32 and reaches the manifold channel 14, is attenuated with oscillation of the thinner part of the dumper plate 26 where the recessed section 15 is formed. Thus, it is possible to prevent so-called crosstalk in which the characteristic of ejecting ink from the nozzles 16 varies with the pressure wave. Further, in the dumper plate 26, through-holes 12*e* are formed at positions overlapping the through-holes 12*d* when seen in the plan view.

In the supply plate 27, through-holes 12*f* to be connected to the through-holes 12*e* and the nozzles 16 are formed at positions overlapping the through-holes 12*e* and nozzles 16 when seen in the plan view.

Next, the piezoelectric actuator 32 will be explained. The piezoelectric actuator 32 includes piezoelectric layers 41*a* to 41*f*, individual electrodes 42*a* and 42*b* (or collectively referred to as the individual electrodes 42), surface individual electrodes 44, common electrodes 43*a* to 43*c* (or collectively referred to as the common electrodes 43), and surface common electrodes 46.

The piezoelectric layers 41*a* to 41*f* are in the shape of a flat plate having a size of all the pressure chambers 10, placed one upon the other in the same direction as the direction in which a plurality of plates 21 to 28 are placed one upon the other, and disposed on the upper surface of the channel unit 31 to cover the pressure chambers 10. The piezoelectric layers 41*a* to 41*f* are fabricated with piezoelectric material composed mainly of ferroelectric lead zirconate titanate which is, for example, mixed crystals of lead titanate and lead zirconate (ternary metal oxides). The piezoelectric layers 41*a* to 41*f* are polarized in the thickness direction beforehand.

The individual electrodes 42*a* and 42*b* are provided between the piezoelectric layers 41*b* and 41*c*, and between the piezoelectric layers 41*d* and 41*e*, respectively. The individual electrodes 42*a* and 42*b* are arranged in the paper feed direction to correspond to a plurality of pressure chambers 10, so that there are five lines of the individual electrodes 42*a* and 42*b* in the scanning direction. Each of the individual electrodes 42*a* and 42*b* has an elongated shape slightly smaller than the pressure chamber 10 when seen in the plan view, and is placed at a position overlapping substantially the center of the pressure chamber 10 when seen in the plan view. On the topmost piezoelectric layer 41*a*, the surface individual electrodes 44 are disposed at positions overlapping the individual electrodes 42 when seen in the plan view so that the surface individual electrodes 44 and the individual electrodes 42*a* and 42*b* are connected to each other via through-holes (not shown) formed in the piezoelectric layers 41*a* to 41*f*. A driving potential is applied to the surface individual electrodes 44 by the driver IC 50, and a driving potential is also applied to the individual electrodes 42*a* and 42*b*. Note that the individual electrodes 42*a* and 42*b* and the surface individual electrodes 44 are equivalent to drive electrodes.

The common electrodes 43*a* to 43*c* are provided between the piezoelectric layers 41*a* and 41*b*, between the piezoelectric layers 41*c* and 41*d*, and between the piezoelectric layers 41*e* and 41*f*, respectively, over the almost entire surface area of the piezoelectric layers 41*a* to 41*f*. On the topmost piezoelectric layer 41*a*, the surface common electrodes 46 are placed near both ends in the paper feed direction, and the common electrodes 43*a* to 43*c* and the surface common electrodes 46 are connected to each other via through-holes (not shown) in a manner similar to the individual electrodes 42. The common electrodes 43 are always held at ground potential by the driver IC 50, and the surface common electrodes 46 are also held at ground potential all the time.

As shown in FIGS. 2 to 4, the driver IC 50 is mounted near one end in the scanning direction of the topmost piezoelectric layer 41*a* of the piezoelectric actuator 32. On the output side of the driver IC 50 (the right side of the driver IC 50 in FIG. 3), the surface individual electrodes 44 and the surface common electrode 46 are connected to the driver IC 50 through wires 45 and 47 formed on the upper surface of the piezoelectric layer 41*a* respectively. Moreover, on the input side of the driver IC 50 (the left side of the driver IC 50 in FIG. 3), the flexible flat cable (FFC) 51 is connected to the driver IC 50 through wires 48 formed on the upper surface of the piezoelectric layer 41*a*, so that the driver IC 50 is electrically connected to the main body.

Since the driver IC 50 is connected to the surface electrodes 44 and 46 formed on the upper surface of the piezoelectric layer 41*a* through the wires 45 and 47, conventional expensive components such as an FPC and COF are not necessary, thereby enabling a reduction in the manufacturing cost. Meanwhile, the input side of the driver IC 50 is connected to a later-described head substrate 52 through the FFC as an inexpensive general connection member.

In the piezoelectric actuator 32, when a driving potential is applied from the driver IC 50 through a desired surface individual electrode 44 to the individual electrode 42, a potential difference is produced between the individual electrode 42 and the common electrode 43, and an electric field is generated in the thickness direction in a part of the piezoelectric layer between the two electrodes 42 and 43. Since the direction of the electric field is parallel to the polarization direction of the piezoelectric layers 41*a* to 41*e*, the piezoelectric layers 41*a* to 41*e* are expanded in the thickness direction by the piezoelectric longitudinal effect. Consequently, the piezoelectric layer 41*f* is pushed by the piezoelectric layers 41*a* to 41*e* expanded in the thickness direction, and deformed to protrude toward the pressure chamber 10. Therefore, the capacity of the pressure chamber 10 becomes smaller, the pressure of the ink in the pressure chamber 10 increases, a pressure wave is created, and the ink is ejected from the nozzle 16 communicated with the pressure chamber 10. Note that the above-mentioned one individual ink channel, part of the piezoelectric layers 41*a* to 41*f* facing one pressure chamber 10, the surface individual electrode 44 corresponding to the pressure chamber 10 and part of the common electrode 43 facing the pressure chamber 10 are equivalent to a single recording element.

Figure 5:
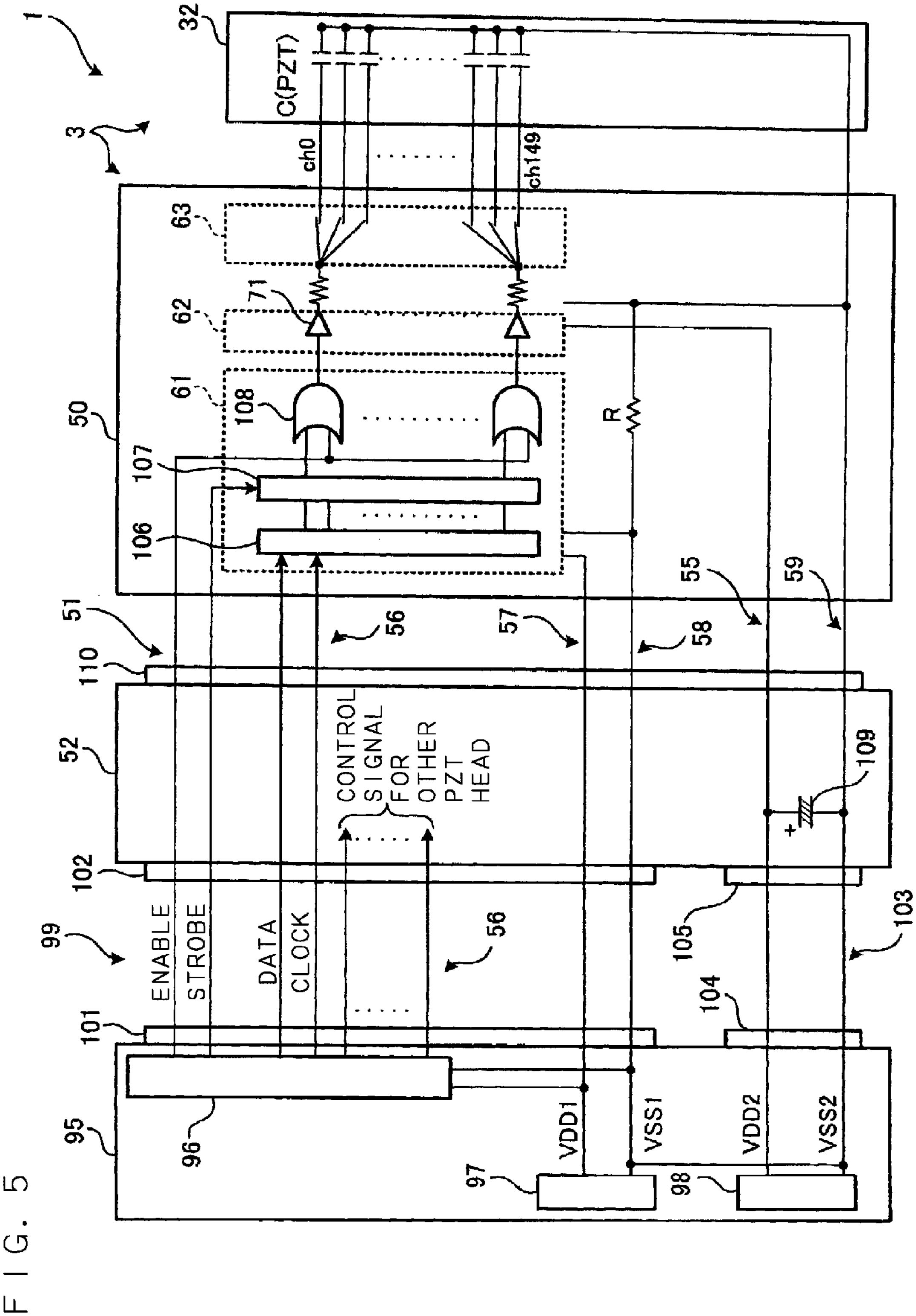
FIG. 5 is a schematic view showing the electrical structure of an inkjet head printer.
Figure 6:
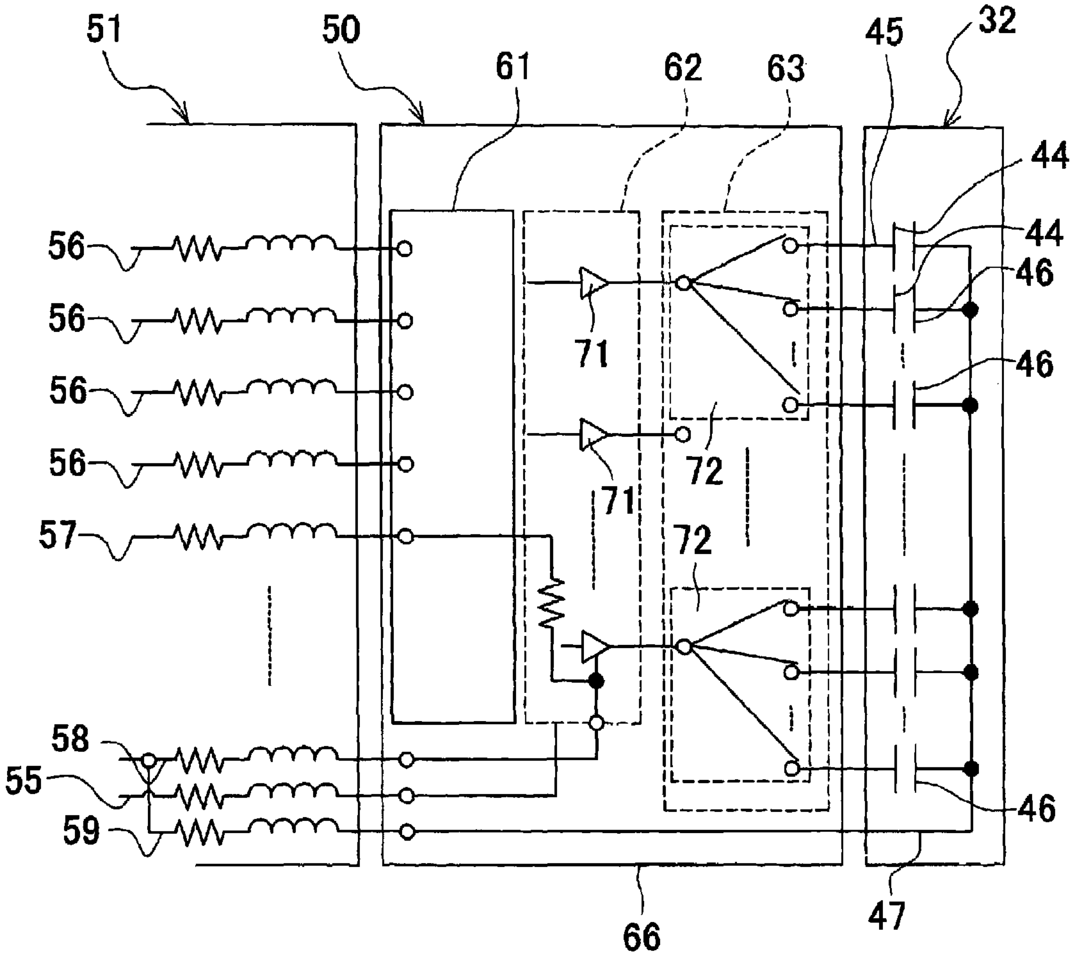
FIG. 6 is a schematic view showing the electrical structures of a piezoelectric actuator and a driver IC.
Figure 7:
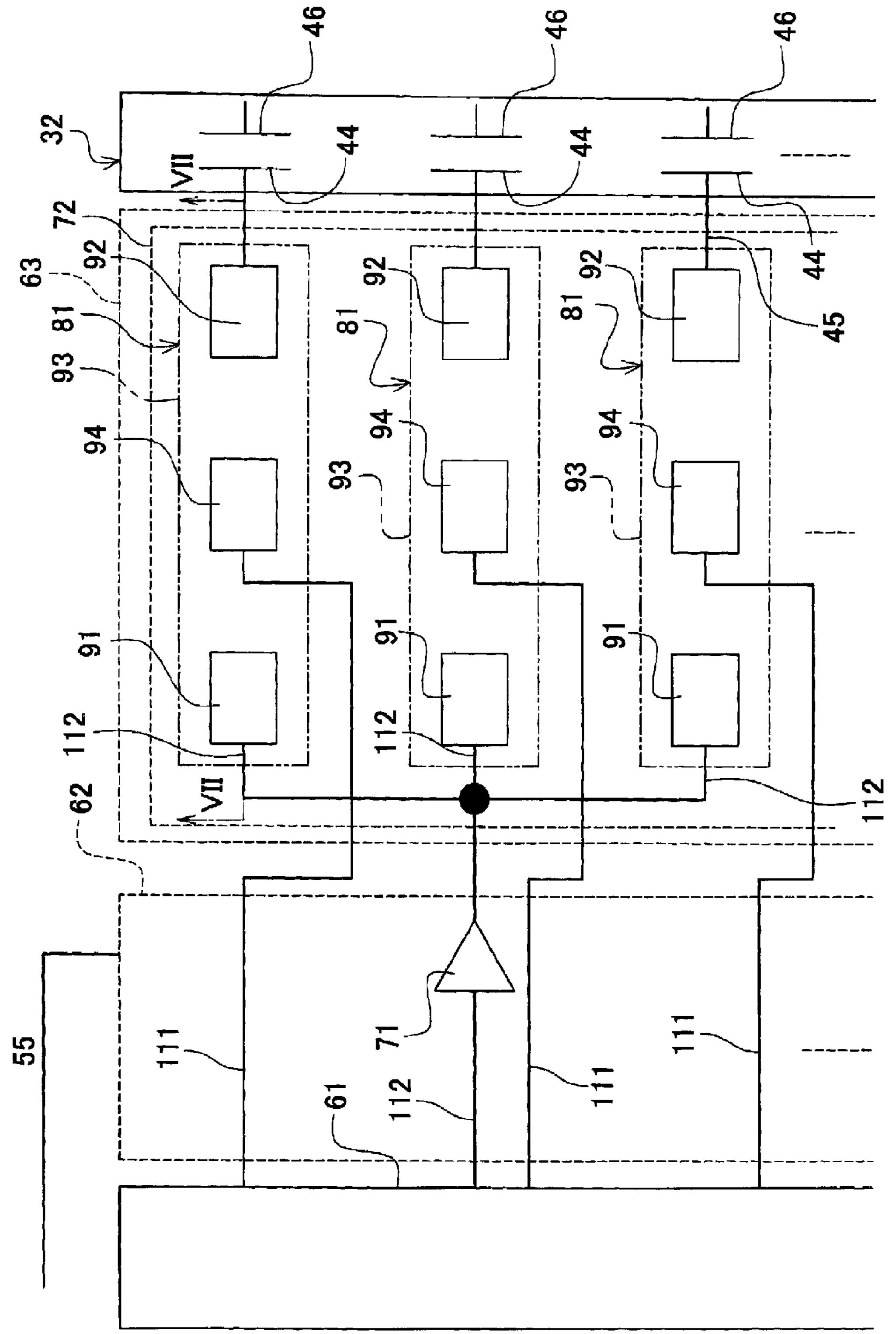
FIG. 7 is a plan view showing in detail a switch unit in FIG. 6.
Figure 8A:
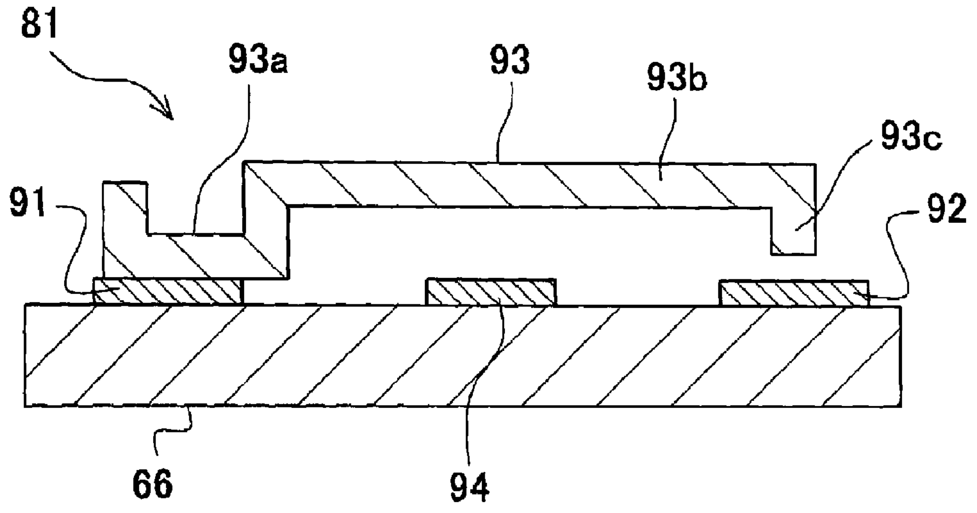
FIG. 8A is a cross sectional view taken along the VII-VII line in FIG. 7 and showing the separated state.
Figure 8B:
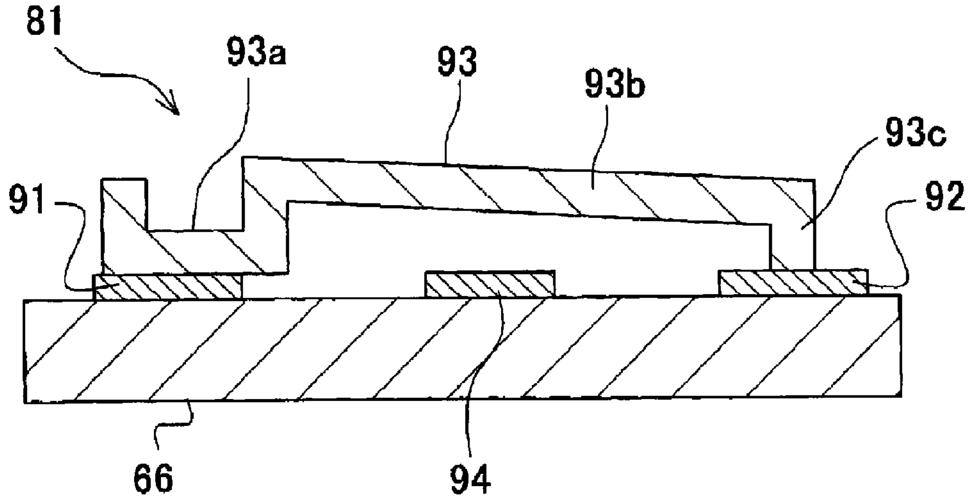
FIG. 8B is a cross sectional view taken along the VII-VII line in FIG. 7 and showing the contact state.

Next, the electrical structure of an inkjet printer will be explained. FIG. 5 is a schematic view showing the electrical structure of the inkjet printer, and FIG. 6 is a schematic view showing in detail the connection between the piezoelectric actuator 32 and the driver IC 50. FIG. 7 is a plan view showing in detail a switch unit 63 in FIG. 6. FIGS. 8A and 8B are cross sectional views taken along the VII-VII line in FIG. 7.

In an inkjet printer 1, as shown in FIG. 5, the main body substrate 95, the head substrate 52, the driver IC 50 and the piezoelectric actuator 32 are connected to each other. Mounted on the main body substrate 95 are a main body control circuit 96, a control signal power source 97, and a drive pulse power source 98. The main body substrate 95 is mounted in the housing of the inkjet printer outside the carriage 2, and the head substrate 52 is mounted in the carriage 2 together with the driver IC 50 and the piezoelectric actuator 32. As to be described later, a control circuit 61, a drive circuit 62 and the switch unit 63 are mounted on the driver IC 50.

The main body control circuit 96 is connected to the control circuit 61 through a control signal line 56, and outputs to the control circuit 61 control signals, such as an enable signal, a data signal, a clock signal, and a strobe signal, based on print data. The control signal power source 97 is connected to the control circuit 61 through a drive VDD1 line 57 for applying a drive voltage and a ground VSS1 line 58, and applies a voltage (for example, 5 volt) to the control circuit 61.

The drive pulse power source 98 is connected to the drive circuit 62 through a drive VDD2 line 55 for applying a drive voltage and a ground VSS2 line 59, and applies a voltage (for example, 16 volt) to the drive circuit 62.

More specifically, as shown in FIG. 5, the main body substrate 95 and the head substrate 52 are connected together by connecting the respective ends of a flexible flat cable 99, including the drive VDD1 line 57, the ground VSS1 line 58 and the control signal line 56 arranged horizontally in the width direction, to a connector 101 provided on the main body substrate 95 and a connector 102 provided on the head substrate 52. The main body substrate 95 and the head substrate 52 are also connected by connecting the respective ends of a flexible flat cable 103, including the drive VDD2 line 55 and the ground VSS2 line 59 arranged horizontally in the width direction, to a connector 104 provided on the main body substrate 95 and a connector 105 provided on the head substrate 52.

Further, the head substrate 52 and the driver IC 50 are connected together by connecting one end of the flexible flat cable 51, including the control signal line 56, the drive VDD1 line 57, the ground VSS1 line 58, the drive VDD2 line 55 and the ground VSS2 line 59 arranged horizontally in the width direction, to the input side of the driver IC 50 through a wire 48 and connecting the other end to a connector 110 provided on the head substrate 52. The output side of the driver IC 50 is connected through the wires 45 and 47 to the respective surface electrodes 44 and 46 of the piezoelectric actuator 32 as described above. Note that the drive VDD1 line 57, ground VSS1 line 58 and ground VSS2 line 59 are connected to each other and held at the ground potential. Thus, a reference electric potential (a common potential, or a ground potential in this embodiment) in the control circuit 61, drive circuit 62 and piezoelectric actuator 32 is defined. The ground VSS2 line 59 is also connected to the surface common electrode 46 of the piezoelectric actuator 32. Moreover, a branch line of the ground VSS2 line 59 and the ground VSS1 line 58 are connected to each other through a resistor R, and the drive circuit 62 and the control circuit 61 are held at the same electric potential.

On the head substrate 52, an electrolytic capacitor 109 is bypass-connected to the drive VDD2 line 55 and the ground VSS2 line 59 and stores charges to be supplied to the control signal power source 97 so as to prevent voltage drop in the drive pulse supply 98 when a large current flows momentarily into the control signal power source 97.

The control circuit 61 generates control signals (drive instruction signals) corresponding to the respective driving elements, based on control signals such as print data from the main body control circuit 96, and includes a shift resistor 106, a D flip-flop 107 and an OR gate 108 which are connected to each other. A number of shift resistors 106, D flip-flops 107 and OR gates 108 corresponding to the number of the nozzles 16 are provided (for example, if the number of the nozzles 16 are 150, 150 shift resistors 106 and so on are provided). Among the control signals transmitted from the main body control circuit 96 through the control signal line 56, the data signal and clock signal are outputted in a synchronous manner to the shift resistor 106, the strobe signal is outputted to the D flip-flop 107, and the enable signal is outputted to the OR gate 108. The data signal and the clock signal are outputted to the drive circuit 62 separately via a driving potential line 112 for converting the drive instruction signal into drive power suitable for the piezoelectric actuator 32 in the drive circuit 62, and a channel selection line 111 for determining from which nozzle 16 (channel) the ink is to be ejected.

The drive circuit 62 generates drive power for driving the piezoelectric actuator 32 based on the control signals outputted from the control circuit 61. The drive circuit 62 includes a plurality of drivers 71 (power supply circuits) less than the number of the nozzles 16 (for example, 50 drivers 71 are provided for 150 nozzles 16). The input terminal of the driver 71 is connected to the OR gate 108, and the output terminal is connected to the switch unit 63 through an internal resistor. In FIG. 7, illustration of the internal resistor is omitted. The data and clock signals, which have been outputted from the shift resistor 106 of the control circuit 61 and have passed through the D flip-flop 107 and OR gate 108, are inputted separately to (50) driving potential lines 112 and (150) channel selection lines 111. The input terminals of the driving potential lines 112 and channel selection lines 111 are connected to the OR gates 108, the output terminals of the driving potential lines 112 are connected to the drivers 71, the output terminals of the drivers 71 are connected to a later-described plurality of switch groups 72 (50 groups) in the switch unit 63, more specifically branched to (150) terminals 91 and then connected. The output terminals of the channel selection lines 111 are connected to later-described (150) gate electrodes 94 in the switch unit 63.

As shown in FIG. 7, each switch group 72 includes a plurality of later-described switches 81 (mechanical switches). The number of the switches 81 is the same as the number of the nozzles 16 (150). The switches 81 are connected through the wires 45 to (150) surface individual electrodes 44 of the piezoelectric actuator 32 corresponding to the number of the nozzles. The structure of the driver IC 50 will be explained in detail.

The driver IC 50 is made from silicon material, etc., and comprises the control circuit 61, drive circuit 62 and switch unit 63 on the surface of a substrate 66 that is a plate member having a substantially rectangular shape when seen in the plan view as MEMS. Here, MEMS (Micro Electro Mechanical System) is a system in which electrical structures, such as circuits, and a mechanical structure are both formed on the surface of a single substrate. As MEMS, since the control circuit 61 and drive circuit 62 as electrical structures and the switch unit 63 as a mechanical structure are both provided on a single substrate 66, it is possible to reduce the size of the switch unit 63 (later-described switch 81). The substrate 66 thus fabricated is mounted on the upper surface of the piezoelectric layer 41*a*.

The control circuit 61 applies a predetermined electric potential (outputs a control signal) to a gate electrode 94 of a later-described switch 81 in the switch unit 63, based on print data inputted from outside through the control signal line 56. Note that the control circuit 61 is a circuit including a switch control circuit.

The switch unit 63 is composed of a plurality of switch groups 72, each switch group 72 comprising a plurality of switches 81 connected to one driver 71 in a shared manner. As shown in FIGS. 7 and 8A, each switch 81 has terminals 91 and 92, a lever 93, and a gate electrode 94. The terminal 91 (first terminal) is formed on the upper surface of the substrate 66, and the terminals 91 of a plurality of switches 81 constituting one switch group 72 are connected to one driver 71. In FIG. 7, for example, three switches 81 (three terminals 91) are connected to one driver 71.

The same number of terminals 92 (second terminals) as that of the terminals 91 are formed on the upper surface of the substrate 66 and connected to the corresponding surface individual electrodes 44 through the wires 45. The gate electrode 94 is made of silicon, for example, and the terminals 91 and 92 and the lever 93 are made of conductor materials such as Cu, Ni, and an alloy of Cu and Zn. The lever 93 includes a flat end section 93*a* with a left end lower surface being always connected to the upper surface of the terminal 91; an extended section 93*b* extended upward from the flat end section 93*a*, bent to the right in the middle in FIGS. 8A to 8B and extended to a position facing the terminal 92; and a contact section 93*c* which is bent down from the extended section 93*b* toward the terminal 92 and selectively comes into contact with the terminal 92. The gate electrode 94 is arranged to face the lever 93 with a space therebetween near substantially the center between the terminals 91 and 92 on the upper surface of the substrate 66. The gate electrode 94 is connected to the control circuit 61. As described above, when a driving potential is applied to a channel selected by the drive potential line 112 by giving a predetermined signal from the control circuit 61 to the gate electrode 94 through the channel selection line 111, the selected switch 81 operates to connect the terminal 92 and the contact section 93*c*.

In short, in such a structure, a plurality of (two or more) switches 81 and surface electrodes 44 are connected to one driver 71. For example, when the number of the nozzles is 150 and three switches 81 are connected to one driver 71 as shown in FIG. 7, the control circuit 61 includes the same number of, that is, 150, shift resistors 106, D flip-flops 107, and OR gates 108 as the number of the nozzles, and the piezoelectric actuator 32 also has 150 surface individual electrodes 44 (and individual electrodes 42). The drive circuit 62 includes 50 drivers 71, 150 channel selection lines 111, 50 or the same number of input terminals of the drive electrode lines 112 as the number of the drivers 71, and 150 or the same number of output terminals of the drive electrode lines 112 as the number of the terminals 91. The number of the terminals 91 which are outputting ends of the drivers 71 are 150. The number of the terminals 92 and that of the gate electrodes 94 connected to the surface individual electrodes 44 are 150.

Thus, even when a number of nozzles 16 are arranged at a high density in the inkjet head 3, the inkjet head 3 has a small number of drivers 71, preventing an excessive increase in the size of the driver IC 50.

Next, the operation of the switch 81 will be explained. In the switch 81, when an electric potential is not applied from the control circuit 61 to the gate electrode 94 through the channel selection line 111, the contact section 93*c* of the lever 93 and the terminal 92 are separated from each other (in the separated state) as shown in FIG. 8A. In short, the connection between the lever 93 and the terminal 92 is physically disconnected. In this state, the connection between the terminals 91 and 92 is disconnected, and the connection between the driver 71 and the surface individual electrode 44 is disconnected. Moreover, in this state, since the terminal 92 and the lever 93 are not in contact with each other, heat generated in the driver IC 50 is hardly transmitted to the inkjet head 3. Thus, it is possible to prevent changes in the viscosity of the ink in the inkjet head 3 due to heat generated in the driver IC 50 and prevent variations in the characteristic of ejecting ink from the nozzles 16.

Further, since the terminal 92 and the lever 93 are separated from each other, a leakage current does not flow from the driver 71 to the surface individual electrode 44. Hence, it is possible to reduce the consumption of power in the driver IC 50.

On the other hand, when a predetermined electric potential is applied to the gate electrode 94 from the control circuit 61 through the channel selection line 111, electrostatic force is generated between the lever 93 and the gate electrode 94. With the electrostatic force, the lever 93 is deformed and the contact section 93*c* is pulled in the direction toward the terminal 92, and then the lower surface of the contact section 93*c* of the lever 93 comes into contact with the upper surface of the terminal 92 (the contact state) as shown in FIG. 8B. Thus, the terminals 91 and 92 are connected through the lever 93, and the driver 71 and the surface individual electrode 44 are connected through the wire 45. At this time, a drive voltage is given to the terminal 91 from the driver 71 through the driving potential line 112. Therefore, the driving potential is applied to the individual electrode 42, and the piezoelectric layer is deformed to enable ejection of ink from the corresponding nozzle.

In order to switch connection and disconnection between the driver 71 and the surface individual electrode 44, it is also possible to provide, instead of the above-mentioned switch 81, an electrical switch, such as a transistor, on the substrate 66 to switch the connection and disconnection between the driver 71 and the surface individual electrode 44. However, when the connection between the driver 71 and the surface individual electrode 44 is disconnected by the electrical switch, unlike the above-mentioned switch 81, the connection between them is not physically disconnected, and therefore there is a possibility that heat generated in the driver 71 may be transmitted to the piezoelectric actuator 32 and the channel unit 31 through the electrical switch and may cause changes in the viscosity of the ink in the channel unit 31, variations in the ink ejection characteristic, and an increase in the consumption of power due to a flow of leakage current from the driver 71 to the surface individual electrode 44.

Here, if the length of the wire 45 connecting the switch 81 and the surface individual electrode 44 is longer, the internal resistance of the wire 45 is larger. Therefore, in the case where a plurality of switches 81 are connected to one driver 71 as described above, if the same number of switches 81 are connected to all of the drivers 71, there may be variations in the response characteristics of the switches 81 when switching between the separated state and the contact state of the switches 81. Thus, in this embodiment, in order to equalize the response characteristics of the respective switches 81, a smaller number of switches 81 are connected to a driver 71 which is connected to the switches 81 connected with longer wires 45. More specifically, for the five lines of surface individual electrodes 44 shown in FIG. 2, a larger number of the switches 81 are connected to a driver 71 to which the switches 81 corresponding to a line of surface individual electrodes 44 nearer to the driver IC 50 are connected.

In the event of ejecting ink from the nozzles 16 in the inkjet head 3, when print data is inputted to the driver IC 50 from outside through the FFC 51, the control circuit 61 determines, based on the inputted print data, from which nozzles 16 the ink is to be ejected and applies a predetermined electric potential to the corresponding gate electrodes 94 through the channel selection lines 111. Accordingly, in the corresponding switches 81, the terminals 91 and 92 are connected through the levers 93 (the connected state).

Moreover, the control circuit 61 outputs a drive instruction signal to the driver 71 through the driving potential line 112, and the driver 71 outputs the driving potential to the terminals 91 of the selected switches 81 in response to the signal. Then, the driving potential is applied to the surface individual electrodes 44 connected to the switches 81 in the connected state, and ink is ejected from the corresponding nozzles 16 as mentioned above.

At this time, since one driver 71 is connected to the terminals 91 of a plurality of switches 81 constituting a switch group 72, it is possible to output the driving potential to a plurality of surface individual electrodes 44 from one driver 71. Further, it is possible to apply the driving potential only to a desired surface individual electrode 44 among those surface individual electrodes 44 by switching between the separated state and the contact state of the switches 81.

According to the inkjet printer 1 constructed as described above, the voltage to be supplied to the control circuit 61 from the control signal power source 97 is supplied through the driving VDD1 line 57 to the control circuit 61 and drives the control circuit 61. On the other hand, the voltage to be supplied to the drive circuit 62 from the drive pulse power source 98 is supplied to the drive circuit 62 through the driving VDD2 line 55, and the electrolytic capacitor 109 on the line is charged. When ejecting ink, a current is supplied from the electrolytic capacitor 109 to the drive circuit 62 through the driving VDD2 line 55 and sufficient current is supplied to the piezoelectric actuator 32.

Figure 9:
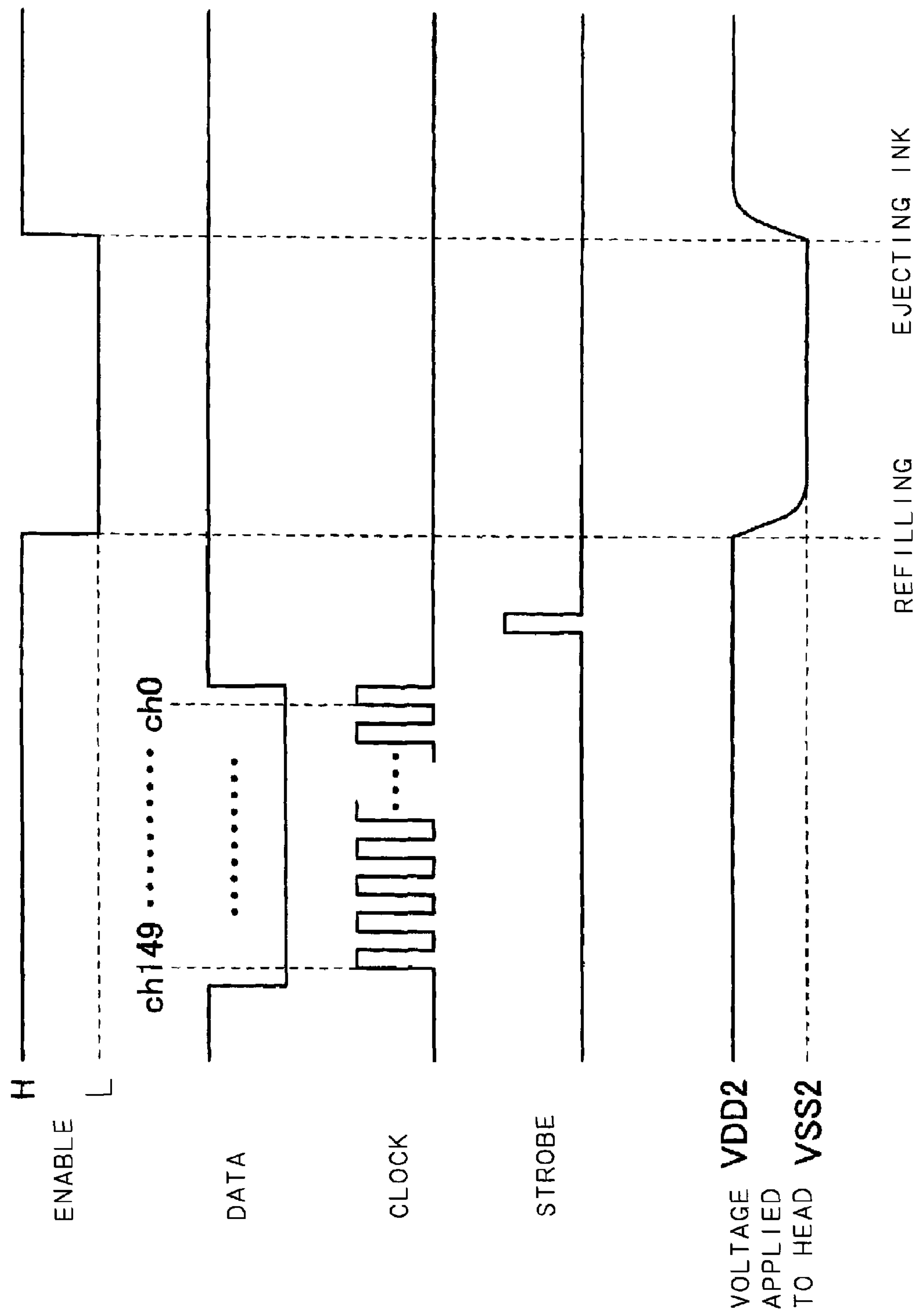
FIG. 9 is a time chart showing the operation performed when ejecting ink.

Referring to the time chart in FIG. 9, the following will explain the ink ejection operation which is performed when a voltage is supplied to the control circuit 61 and drive circuit 62. When the reset signals for the shift resistors 106 and D flip-flops 107 are in the L state, data (0 for ejection, and 1 for no ejection) are serially retrieved from an image memory in the main body control circuit 96 in a known manner, inputted to the shift resistors 106, and converted into parallel data corresponding to all nozzles 16. Further, the data converted into parallel data are latched by the D flip-flops 107 and outputted to the OR gates 108 in synchronous with a strobe signal.

On the other hand, an enable signal is usually applied to each OR gate 108 in the H state, and when the driver 71 is turned on, the terminals 91 and 92 of the corresponding switches 81 are connected. Therefore, a voltage (VDD2) is applied through the driving VDD2 line 55 to the piezoelectric actuator 32, and the pressure chambers 10 are maintained in a shrunk state. Shortly after the strobe signal, the enable signal is switched into the L state only for a certain period of time. At this time, if the data latched by the D flip-flop 107 is 1 representing no ejection, the driver 71 corresponding to the data is kept ON and ink is not ejected. If the data latched by the D flip-flop 107 is 0 representing ejection, the driver 71 corresponding to the data is turned off, the pressure chamber 10 is expanded, and ink flows into the pressure chamber 10. Then, when an enable signal rises again after the certain period of time, the OR gate 108 is turned into the H state, the driver 71 resumes the supply of power to the piezoelectric actuator 32, and the pressure chamber 10 is restored into the shrunk state to eject ink.

According to the above-explained embodiment, since it is possible to apply a driving potential to a plurality of surface individual electrodes 44 by one driver 71, even if a large number of nozzles 16 are arranged at a high density in the inkjet head 3, the number of the drivers 71 is small, thereby achieving a small-size driver IC 50.

Moreover, when the connection between the driver 71 and the surface individual electrode 44 is disconnected by the switch 81, the connection between them is physically disconnected, and therefore a leakage current does not flow between the driver 71 and the surface individual electrode 44. Thus, the consumption of power in the drive IC 50 is reduced.

In addition, when the connection between the driver 71 and the surface individual electrode 44 is disconnected by the switch 81, the connection between them is physically disconnected, and therefore heat is hardly transmitted from the driver IC 50 to the inkjet head 3. It is thus possible to prevent changes in the viscosity of the ink in the inkjet head 3 due to heat generated in the driver IC 50. Consequently, it is possible to prevent variations in the characteristic of ejecting ink from the nozzles 16.

Further, by constructing the driver IC 50 as MEMS, it is possible to easily form the control circuit 61, drive circuit 62 (driver 71) and switch unit 63 (switch 81), and it is possible to reduce the size of the switch 81.

The switch 81 has a simple structure composed of the terminals 91 and 92 provided on the surface of the substrate 66, the lever 93 and the gate electrode 94. It is possible to easily switch the connection and disconnection between the terminal 92 and the lever 93 by applying a predetermined electric potential (outputting a control signal) to the gate electrode 94.

When the wire 45 between the switch 81 and the surface individual electrode 44 is longer, the internal resistance is larger. Therefore, if the same number of the surface individual electrodes 44 are connected to one driver 71 irrespective of the lengths of the wires 45, there may be variations in the response characteristics when the switches 81 are activated. However, by reducing the number of switches 81 to be connected to a driver 71 which is connected to the switches 81 connected to the corresponding surface individual electrodes 44 with longer wires 45, it is possible to obtain uniform response characteristics when the switches 81 are activated.

Further, since the driver IC 50 is disposed on the upper surface of the piezoelectric layer 41*a*, it is possible to form the wires 45 and 47 for connecting the surface electrodes 44, 46 to the driver IC 50 on the upper surface of the piezoelectric layer 41*a*. Therefore, it is not necessary to use expensive wiring members such as a COF and FPC to connect the surface electrodes 44 and 46 and the driver IC 50, and it is possible to reduce the cost.

Next, the following will explain a modified example in which various changes are made to the above embodiment. Here, the members having the same structures as in the above embodiment will be designated by the same codes and the explanation thereof will be omitted suitably.

Figure 10:
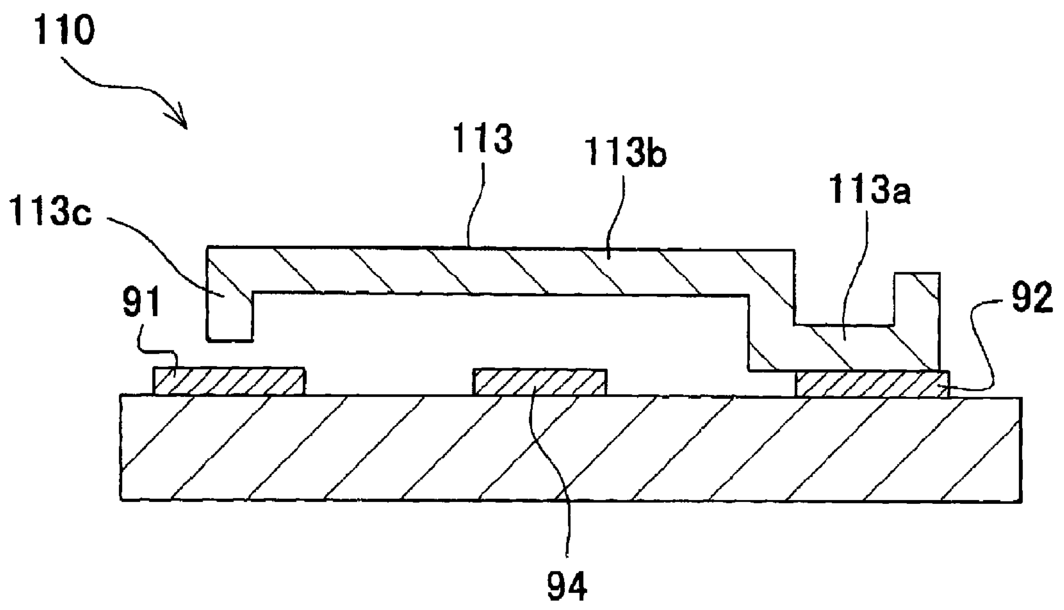
FIG. 10 is a cross sectional view of Modified Example 1 corresponding to FIG. 8A.

In one modified example, as shown in FIG. 10, a switch 110 includes a lever 113 having the same structure as the lever 93 except that the right and left sides of the lever are flipped (see FIGS. 8A and 8B). In other words, the lever 113 comprises a flat end section 113*a* with a right end lower surface being always connected to the upper surface of the terminal 92; an extended section 113*b* extended upward from the flat end section 113*a*, bent to the left in the middle and extended to a position facing the terminal 91; and a contact section 113*c* which is bent down from the extended section 113*b* toward the terminal 91 and selectively comes into contact with the terminal 91 (Modified Example 1). In this case, when a predetermined electric potential is not applied to the gate electrode 94, the lever 113 and the terminal 91 are separated from each other. Like the above-mentioned embodiment, with the application of a predetermined electric potential to the gate electrode 94, the lever 113 is deformed by electrostatic force between the gate electrode 94 and the lever 113, pulled in the direction toward the terminal 91, and the lower surface of the contact section 113*c* of the lever 113 comes into contact with the upper surface of the terminal 91.

In the above embodiment, when a predetermined electric potential is not applied to the gate electrode 94, the terminal 92 and the lever 93 are separated from each other, but when a predetermined electric potential is applied to the gate electrode 94, the terminal 92 and the lever 93 come into contact with each other. Conversely, it may also be possible to configure a structure where the lever 93 is always connected to the terminal 92 (in the contact state) when a predetermined electric potential is not applied to the gate electrode 94, but, when a predetermined electric potential is applied to the gate electrode 94, electrostatic force is generated in the opposite direction to that in the above embodiment between the gate electrode 94 and the lever 93, that is, in the direction separating the gate electrode 94 and the lever 93 from each other, and the lever 93 is deformed and separated from the terminal 92 (brought into the separated state) by the electrostatic force. In this case, by applying a predetermined electric potential to the gate electrode 94 when the piezoelectric actuator 32 is not driven and removing the predetermined electric potential applied to the gate electrode 94 corresponding to the nozzle 16 from which ink is to be ejected when driving the piezoelectric actuator 32, it is possible to apply a driving potential to only a desired surface individual electrode 44 like the above embodiment.

The structure of the switch is not limited to that explained in the above embodiment. It is possible to use other structure as long as the switch is a mechanical switch capable of connecting a driver 71 to a surface individual electrode 44 corresponding to a nozzle 16 from which ink is to be ejected, and capable of physically disconnecting the connection between a driver 71 and a surface individual electrode 44 corresponding to a nozzle 16 from which ink is not to be ejected.

Although the above explanation illustrates an example applied to a driver IC for driving an inkjet head which ejects ink by driving a piezoelectric actuator, it is also possible to apply the present invention to an inkjet head which ejects ink with a mechanism other than the piezoelectric actuator, or a driver device for driving an element, other than the inkjet head, for ejecting liquid droplets onto a recording medium.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A driver device for driving a plurality of recording elements for recording on a recording medium by supplying electric power based on inputted data, comprising:

at least one power supply circuit for supplying the electric power to said plurality of recording elements;

a plurality of mechanical switches corresponding to said plurality of recording elements respectively and capable of switching connection and disconnection between said plurality of recording elements and said power supply circuit; and a switch control circuit for controlling switching between the connection and disconnection implemented by said plurality of mechanical switches, wherein said power supply circuit, said mechanical switches and said switch control circuit are constructed as MEMS, and two or more of said mechanical switches are connected to one of the power supply circuit(s), wherein the driver device further comprises a plurality of said at least one power supply circuits, and said plurality of recording elements and said plurality of mechanical switches are connected with wires, respectively, and wherein a number of the mechanical switches connected to each of the plurality of said at least one power supply circuits reduces as a length of the wire connected to the mechanical switches increases.

2. The driver device according to claim 1, wherein each of said plurality of mechanical switches comprises:

a first terminal connected to said power supply circuit and a second terminal connected to said recording element, said first and second terminals being provided on a surface of a substrate provided in MEMS;

an electrically conductive lever connected always to one of said first and second terminals and capable of selectively implementing either a contact state in which the lever comes into contact with the other to connect said recording element and said power supply circuit or a separated state in which the lever separates from the other to disconnect the connection between said recording element and said power supply circuit; and a gate electrode arranged on the surface of said substrate to face said lever with a space therebetween, wherein said switch control circuit outputs a control signal for switching between the contact state and the separated state to said gate electrode based on the data, and said lever is deformed by electrostatic force functioning between said lever and said gate electrode and switches between the contact state and the separated state, according to the control signal inputted to said gate electrode.

3. A liquid droplet ejection device comprising;

a channel unit having liquid channels including a plurality of nozzles for ejecting liquid droplets and a plurality of pressure chambers communicated with said nozzles respectively;

a piezoelectric actuator for giving pressure for ejection to liquid in said pressure chambers, said piezoelectric actuator including a piezoelectric layer arranged on a surface of said channel unit to cover said plurality of pressure chambers and a plurality of drive electrodes formed on a surface of said piezoelectric layer to correspond to said plurality of pressure chambers; and a driver device, mounted on the surface of said piezoelectric layer, for driving said piezoelectric actuator, wherein said driver device comprises:

at least one power supply circuit for supplying electric power to said plurality of drive electrodes;

a plurality of mechanical switches corresponding to said plurality of drive electrodes respectively, connected to said plurality of drive electrodes and said power supply circuit, and capable of switching connection and disconnection between said plurality of drive electrodes and said power supply circuit; and a switch control circuit for controlling switching between the connection and disconnection implemented by said mechanical switches, wherein said power supply circuit, said mechanical switches and said switch control circuit are constructed as MEMS, and two or more of said mechanical switches are connected to one of the power supply circuit(s).

* * * * *